United States Patent [19]
Condon

[11] Patent Number: 5,287,730
[45] Date of Patent: Feb. 22, 1994

[54] PLUMBING LEAKAGE TEST APPARATUS AND METHOD OF USE

[75] Inventor: Duane R. Condon, Ramona, Calif.
[73] Assignee: Securus, Inc., San Marcos, Calif.
[21] Appl. No.: 900,648
[22] Filed: Jun. 18, 1992
[51] Int. Cl.⁵ ............................................. G01M 3/04
[52] U.S. Cl. ................................... 73/49.8; 138/94.3
[58] Field of Search ..................... 73/49.8, 46, 40.5 R; 138/94.3, 94

[56] References Cited

U.S. PATENT DOCUMENTS

| | | | |
|---|---|---|---|
| 3,051,201 | 8/1962 | Wilson | 138/94.3 |
| 3,319,661 | 5/1967 | Shindler | 138/94.3 |
| 3,860,038 | 1/1975 | Forni | 138/94.3 |
| 4,194,721 | 3/1980 | Nachtigahl | 138/94.3 X |
| 4,271,870 | 6/1981 | Butler et al. | 138/94.3 |
| 4,343,332 | 8/1982 | Williams, 3rd et al. | 138/94.3 |
| 4,765,361 | 8/1988 | Clifford | 138/94.3 X |

Primary Examiner—Hezron E. Williams
Assistant Examiner—Joseph W. Roskos
Attorney, Agent, or Firm—Knobbe, Martens, Olson & Bear

[57] ABSTRACT

An apparatus for testing a network of plumbing pipes for leaks comprises a pair of housings and a slidable test plate. The test plate is interposed between the housings to block fluid flow through the housings when inspecting the pipe network for leaks. After testing is complete, the test plate is removed from the housings and the housings remain fixed as a permanent part of the pipe network.

31 Claims, 3 Drawing Sheets

PLUMBING LEAKAGE TEST APPARATUS AND METHOD OF USE

BACKGROUND OF THE INVENTION

1. Field of the Invention

The present invention generally relates to plumbing systems and, in particular, to leakage test fittings for plumbing systems.

2. Description of Related Art

Municipality building codes generally require building contractors and/or plumbing sub-contractors to test plumbing systems for leaks either by a water test (i.e., a hydrostatic test) or by an air test (i.e., a pneumatic test) in accordance with the Uniform Plumbing Code. Leakage testing of installed plumbing networks, however, commonly is a grueling task for plumbing contractors. Plumbing networks typically wind through multiple stories of a building and have numerous possible sources of leaks at the interconnections between pipe sections and elbows, valves, or like junctions. Conventional leakage testing methods also are time consuming, dirty, wet and often hazardous.

A prevalent leakage testing method involves removing a short section of pipe at the base of the pipe system and replacing the pipe section with a T-joint. A plumber subsequently inserts a pre-formed inflatable rubber balloon or "test plug," connected to a retention chain, into the center opening of the T-joint, and inflates the balloon to block the fluid flow through the test pipe. The plumber then fills the pipe system above the inflated balloon with water and inspects the pipe system for leaks.

This leak testing procedure, however, suffers from several drawbacks. The standing column of water above the inflated balloon exerts a substantial amount of pressure on the balloon during the inspection process. Because the balloon can only withstand limited pressure without bursting, this method is restricted to testing a maximum of four or five floors (i.e., about 40 feet (12.2 meters) in height). Even when testing just a few floors, about 20 percent of the balloons rupture due to fatigue, causing substantial flooding and damaging the building. Such flooding is especially problematic and costly when occurring in multiple story buildings where the contractor is simultaneously finishing the lower floors with dry-wall, cabinetry, carpeting, etc.

Additionally, under-inflated balloons cannot support the water column in the pipe system; if the balloon retention chain breaks, the resultant water flow carries the balloon into the pipe system well below the T-joint. The balloon commonly lodges somewhere in the pipe system, blocking the pipe. A plumber then must determine where the balloon lodged in the plumbing network and remove the balloon by disassembling that portion of the network, a tedious and time-consuming process.

Plumbers also have injured their hands and fingers while attempting to remove the inflated balloons. In cases where the retention chain breaks, the chain has whipped and has severely injured the face and/or eyes of the plumber.

A number of prior plumbing test fittings have been developed to overcome the aforementioned problems associated with the use of an inflatable balloon in leakage testing plumbing networks. For instance, U.S. Pat. No. 3,941,156 issued to Metzger discloses a plumbing test fitting with a closure plate extending across the fitting, and a valve in communication with the test pipe chamber above the closure plate U.S. Pat. No. 4,932,241, issued to Carmody, et al., discloses a similar plumbing test fitting comprising a section of pipe with two chambers separated by a fixed closure plate. Water is introduced into the pipe system through an upper port in the test fitting to fill the pipe network above the closure plate. The system is then inspected for leaks, preferably through the use of a pressure gauge attached to the fitting. The pipe system is then drained by connecting the upper port via a bypass hose to a lower port in communication with the bottom end of the test fitting.

Both prior plumbing test fittings disclosed by the Metzger and Carmody, et al., patents unfortunately require removal of the test fitting and installation of an ordinary pipe section after the testing procedure to return the piping system to its original flow capacity. Installation and removal of these prior test fittings are laborious tasks, and flooding commonly occurs when removing these test fittings which typically damages the floors below. These devices also do not provide a means for testing the joints between the pipe network and the ordinary pipe section replacing the test fixtures. Thus, these devices do not allow the plumber to test all junctions or the plumbing network. Moreover, these prior test fittings are overly complicated and thus costly.

U.S. Pat. No. 3,045,706 to Dillon discloses an in-line valve designed primarily to stop fluid flow while servicing downstream equipment. The valve includes a solid "lamb chop" shaped plate which a plumber rotates across the pipe to stop fluid flow. Use of the apparatus is burdensome, because a series of screws must be loosened to allow the plumber to rotate plate into the closed position. The plumber must then tighten the screws to create a sealed system in the closed position. The plumber must again loosen the screw and rotate the plate into the open position, and then tighten the screws to create a sealed system in the open position.

Thus, a need exists for a simple, effective and ergonomic leakage test fitting which permits ready testing of a pipe network.

SUMMARY OF THE INVENTION

One aspect of the present invention involves an apparatus for permanent installation in a network of plumbing pipes to facilitate safe, simple and sanitary testing of the network for fluid leakage and to allow simple return of the network to normal operation after leakage testing. The apparatus includes a plate for blocking fluid flow through the network and a fitting being configured to insert between two sections of the network. The fitting defines a through bore about a longitudinal axis and defines a socket configured to receive the plate through a socket aperture. The socket is generally positioned transversely to the longitudinal axis such that the plate blocks the through bore when inserted into the fitting. The plate is selectively removable from the socket.

The apparatus additionally includes a sealing member disposed across the socket aperture. The sealing member sits against the plate with the plate inserted into the socket to form a generally fluid-tight seal with the plate. The plate and sealing member prevent fluid communication either through the fitting or through the socket aperture. With the plate removed from the fitting, the sealing member sits against the fitting so as to form a seal across the socket aperture, thereby preventing fluid communication through the socket aperture. Fluid, however, flows through the fitting with the plate removed.

Advantageously, the test plate easily slides into the socket to block the fitting for leakage testing and easily slides out of the socket to return the network to normal operation. No adjustments or alterations to the network are required to leakage test the piping system. In addition, once the fitting is initially installed in the network, the fitting remains a permanent part of the plumbing system to facilitate repeated testing of the network with little effort to close off the network and to test all junctions of the plumbing system. Moreover, the network is block without spilling of the fluid (commonly waste) in the pipe network. Consequently, the leakage test apparatus provides a easy, effective and ergonomic means for leakage testing pipe networks.

In a preferred embodiment, the apparatus comprises a first and second housings each defining a through bore. Each housing comprises a generally tubular portion attached to a flange having a generally planar flange face with a sealing member surrounding the bore. The apparatus also includes a selectively removable plate interposed between the first and second housing flange faces to block the bores of the first and second housings. Fastener means urge the sealing members of the first and second housings into contact with the plate when the plate is interposed between the first and second housings so as to form generally fluid-tight seals with the plate to prevent fluid communication through first and second housings. The fastener means further urge the first and second sealing members into contact with each other when the plate is removed so as to form a sealed joint between the first and second housings and to allow fluid communication through the first and second housings.

In accordance with a preferred method of using the present invention to leak test a network of plumbing pipes, the first and second housings are aligned in a generally coaxial position and the flange faces are juxtaposed. A test plate is then interposed between the first and second housing flange faces to block the bore of the first and second housings. The fastener means are applied to the first and second housings to interconnect the housings. The fastener means urge the sealing members of the first and second housings into contact with the plate thereby forming generally fluid-tight seals with the plate to prevent fluid communication through first and second housing in order to test of the pipe network. The network is then inspected by filling the network with water or air, and examining the pipe network for leaks.

BRIEF DESCRIPTION OF THE DRAWINGS

These and other features of the invention will now be described with reference to the drawings of a preferred embodiment which is intended to illustrate and not to limit the invention, and in which.

DETAIL DESCRIPTION OF A PREFERRED EMBODIMENT

Figure 1:
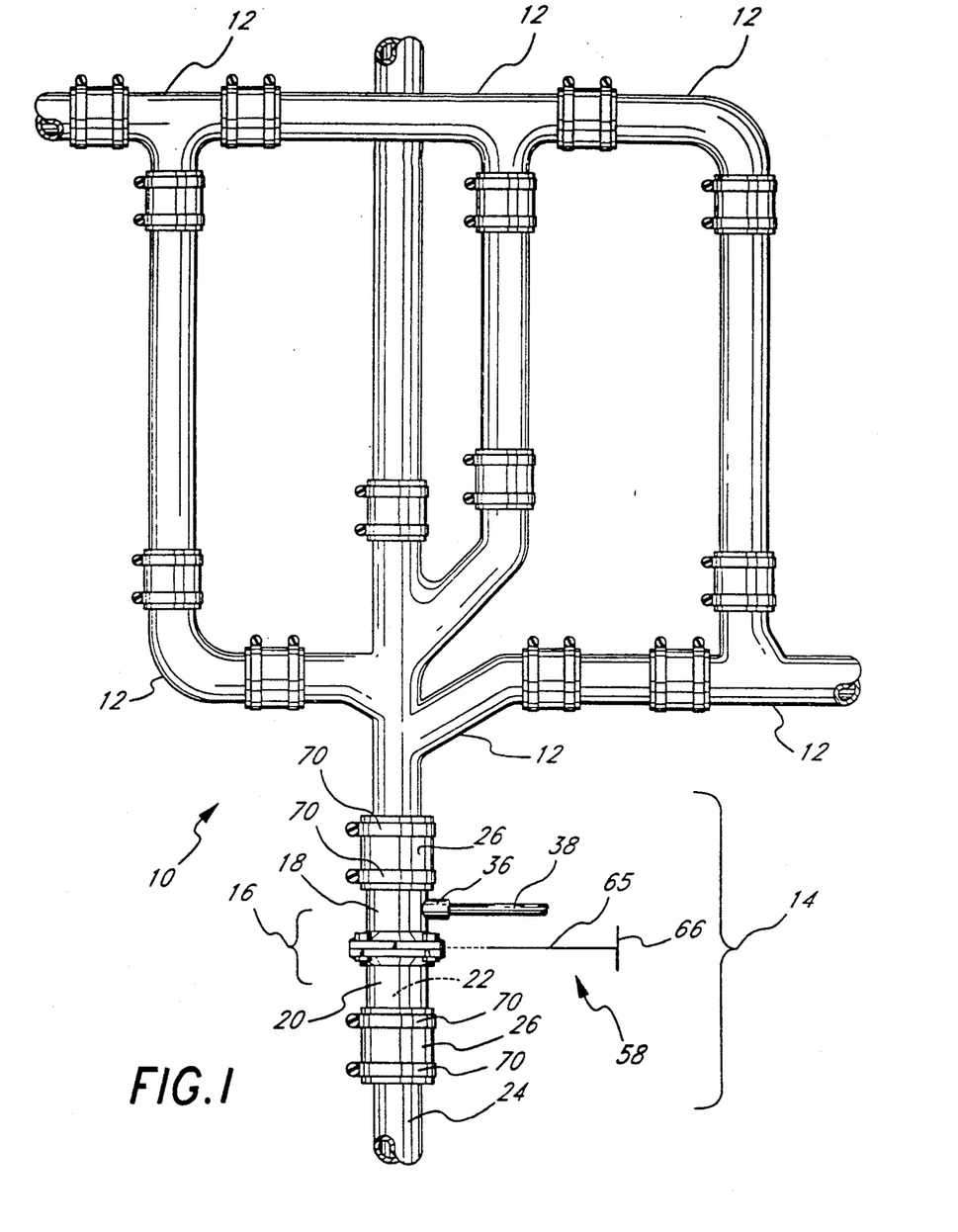
FIG. 1 is a side elevational view of a plumbing test apparatus in accordance with an embodiment of the present invention installed in an exemplary network of plumbing pipes.

FIG. 1 illustrates an exemplary section of a conventional sanitary plumbing network 10 including multiple fittings 12. Such fittings 12 typically comprises valves, elbows, T-joints and like junctions which interconnect sections of pipe. Although the present invention is illustrated as being used with a conventional sanitary drainage or vent plumbing system, it is contemplated that the present invention could be used with any type of fluid conduit system.

The plumbing network 10 advantageously includes an in-line leakage test apparatus 14 in accordance with the present invention. FIG. 1 illustrates the test apparatus 14 as installed in a vertical section of the network 10; however, it is understood that the test apparatus 14 could be installed in the plumbing network regardless of its orientation. It is also contemplated that the plumbing network 10 could comprise more than one test apparatus 14 to facilitate testing sections of the plumbing network between test apparatuses 14. For the purpose of illustration, however, the following discussion only addresses testing the section of the plumbing network 10 above the illustrated test apparatus 14.

The test apparatus 14 advantageously remains permanently attached to the pipe network 10 to facilitate repeated testing of the junctions the pipe network 10. Thus, the type of material comprising the fixture 16 is desirably compatible with the material of the existing network 10, such as, for example, black or gray cast iron, brass, bronze, copper or an integrally molded plastic, such as, for example, polyacrylonitrile-butadienyl-styrene("ABS") or polyvinylchloride ("PVC"). For instance, where the pipe network 10 comprises copper pipes and fittings, the fixture 16 preferably comprises copper, brass or bronze in order to solder or braze the fixture 16 between two copper pipe sections 24. Alternatively, where the pipe network 10 comprises cast iron pipes and fittings, the fixture 16 preferably comprises cast iron and is secured in place by no-hub sleeve 26, as illustrated in FIG. 1 and discussed in detail below.

The test apparatus 14 comprises a fixture 16 formed by a pair of substantially identical housings 18, 20. The fixture 16 defines a through bore 22 preferably having a diameter generally equal to that of the adjacent pipe sections 24, and is configured to be secured between the two adjacent pipe sections 24 with the through bore 22 coaxially positioned with the bores of the adjacent pipe sections 24.

Figure 2:
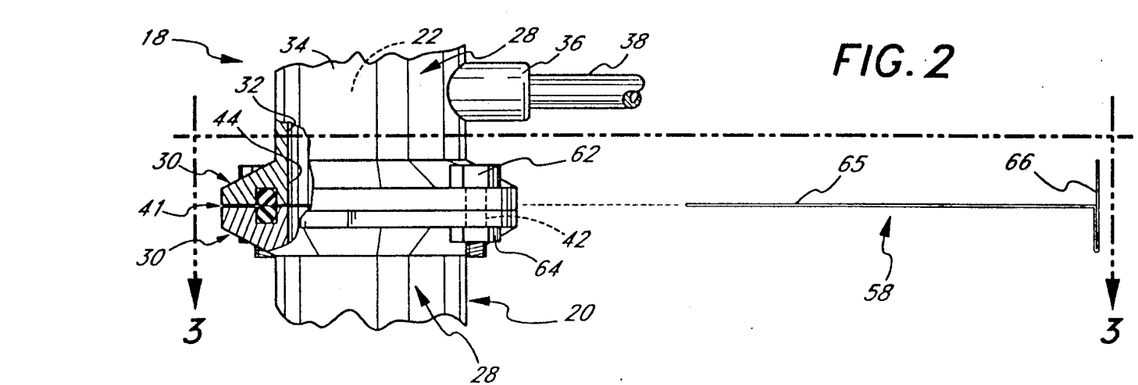
FIG. 2 is an enlarged, partial cut-away, side elevational view of the plumbing test apparatus of FIG. 1.

FIG. 2 illustrates the opposed housings 18, 20 forming the fixture 16. It is contemplated that the structure of the first and second housings 18, 20 will be substantially identical, and a description herein of one will be understood as applying equally to both, unless specified to the contrary.

Each housing 18, 20 includes a flange 30 connected to a tubular portion 28 which has a sufficiently long length to facilitate connecting the housing 18, 20 to the adjacent pipe section 24. The tubular portion 28 preferably has a minimum length to reduce fabrication and shipping costs of the test fixture 16. In an exemplary embodiment, each housing 18, 20 has a length ranging between 2.60 inches and 3.10 inches (6.6 cm and 7.9 cm); however, the dimension of the fixture 16 can be readily customized to suit a specific environment of use.

The tubular section 28 has a generally cylindrical exterior surface 34 and defines a first generally cylindrical through bore section 32 which forms a portion of the fixture through bore 22. The diameter of the through bore section 32 and the exterior surface 34 of the tubular portion 28 preferably match the interior and exterior diameters of the adjacent pipe sections 24 between which the fixture 16 is installed. The through bore section 32 desirably has a diameter ranging between ¼ inch (0.63 centimeters) and 50.0 inches (1.27 meters), and more desirably has a diameter of approximately 1.5, 2.0, 3.0, 4.0, 5.0, 6.0, 8.0 or 10.0 inches (approximately 3.81, 5.08, 7.62, 10.16, 12.70, 15.24, 20.32 or 25.40 centimeters, respectively). However, as will be readily appreciated by one skilled in the art, the test fixture 16 can be manufactured in a wide variety of diameter sizes, including standard metric sizes, in addition to those described herein.

The tubular portion 28 of the first housing 18 includes a port 36 communicating with the through bore 32. The port 36 is threaded or otherwise configured to couple with an inlet pipe or hose 38. The inlet pipe 38 supplies fluid to the portion of the piping network 10 above the fixture 16 when testing for leaks. A plug or a cap (not shown) desirably seals the port 36 during normal fluid flow operation to prevent fluid from flowing through the port 36. The second housing 20 desirably does not include a similar port.

Figure 3:
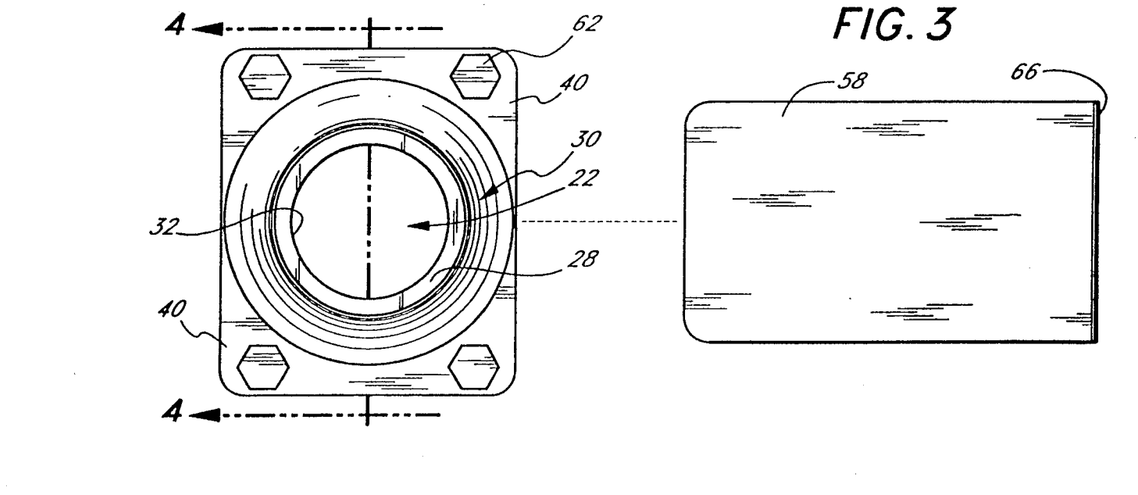
FIG. 3 is cross-sectional view of the plumbing test apparatus taken along line 3—3 of FIG. 2.

Referring to FIGS. 2 and 3, the flange 30 attaches to one end of the tubular portion 28 and flares radially outwardly from the exterior surface 34 of the tubular section 28 to form a generally frusto-conical shape. The flange 30 includes a rectangular-shaped flange plate 40 positioned generally perpendicularly to a longitudinal axis of the housing 18, 20 and positioned about an engagement end 41 of the flange 30, distal of the tubular portion 28. As used herein, "proximal" and "distal" are used in reference to the proximity of the engagement end 41 of each housing 18, 20.

The flange plate 40 defines four bolt holes 42 positioned proximate the four corners of the rectangular plate 40. The axes of the bolt holes 42 are positioned generally parallel to the longitudinal axis of the housing 18, 20.

Referring back to FIG. 2, the flange 30 also defines a second through bore section 44 having a diameter generally equal to and being positioned coaxially with the first through bore section 32 defined by the tubular portion 28. Each housing 18, 20 therefore defines the generally uniform through bore which extends through the housing 18, 20 in the longitudinal direction and is defined by the through bore sections 32, 44 of the tubular portion 28 and the flange 30.

Figure 4:
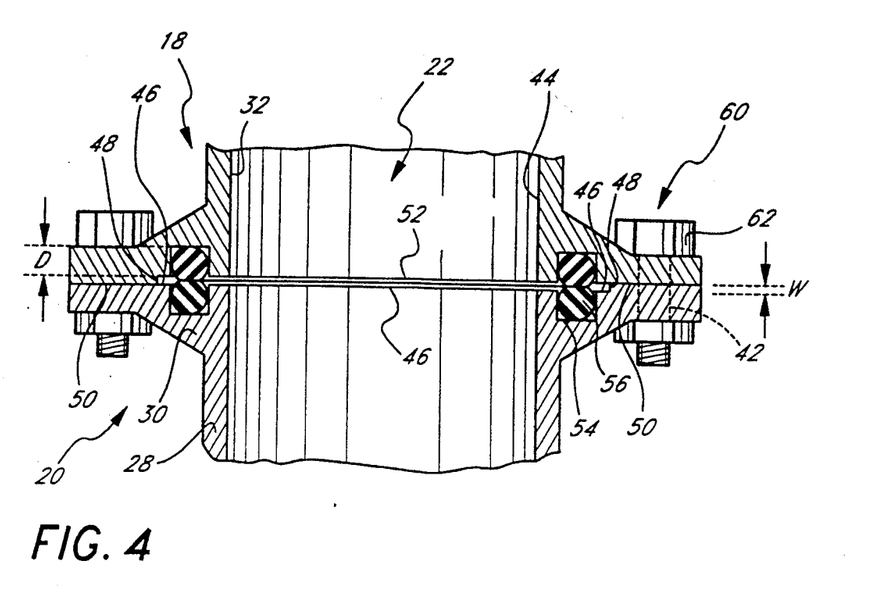
FIG. 4 is a partial cross-sectional view taken along line 4—4 of FIG. 3 illustrating a fixture of the plumbing test apparatus.

As illustrated in FIG. 4, the flange 30 includes a planar interface surface 46 at the engagement end 41. The interface surface 46 terminates at a step 48 defined between the interface surface 46 and an adjacent planar flange surface 50 on one side of the through bore 44. On the opposite side of the through bore 44, the interface surface 46 blends into the planar flange surface 50. Consequently, as illustrated in FIG. 4, the housings 18, 20 form a thin gap or socket 52 extending between the housings 18, 20 with the housings 18, 20 connected at the engagement ends 41 and with the steps 48 of the housings 18, 20 positioned diametrically opposite from each other. Alternatively, a pair of diametrically opposed spacers (not shown) may be used to form the gap 52 between the housings 18, 20 in place of the steps 48 formed on the engagement ends 41 of the housings 18, 20. In an exemplary embodiment, the gap 52 has a width W (defined by the height of the steps 48) of approximately 0.085 inch (0.216 centimeter). However, the dimensions of the gap 52 can be selected to produce a desired seal pressure for a specific O-ring size, shape and material, as known in the art and discussed below.

The interface surface 46 of the housing 18, 20 defines an annular O-ring groove 54 configured to receive a portion of an O-ring 56. The O-ring groove 54 is preferably concentrically positioned about the through bore 44 of the flange 30.

As illustrated in FIG. 4, the test apparatus additionally includes a pair of O-rings 56 which sit in the O-ring grooves 54. Each O-ring 56 has an undeflected cross-sectional diameter larger than the depth D of the O-ring groove 54 such that a portion of the O-ring 56 protrudes from the O-ring groove 54 beyond the interface surface 46 with the O-ring 56 properly seated in the O-ring groove 54. The O-ring 56 desirably has a cross-sectional diameter of 0.062 inch (0.157 centimeter) larger than the depth D of the O-ring grooves 65. In an exemplary embodiment, the O-ring groove 54 has a depth of 0.148 inch (0.376 centimeter) and the O-ring 56 has a cross-sectional diameter of approximately 0.210 inch (0.533 centimeter).

It is understood, however, that the O-ring cross-sectional diameter, the depth D of the O-ring groove and the width W of the gap 52 (i.e., the height of the step 48) can be readily customized to suit specific pressure requirements particular to an environment of use. Thus, for a specific operation pressure $P_o$ (i.e., the pressure within the pipe system 10 under normal operating conditions) and for a specific test pressure $P_t$ (i.e., the pressure within the pipe system 10 under testing conditions), one skilled in the art could select the type of O-ring 56 (e.g., material, shape and cross-sectional sized), the depth D of the O-ring groove and the width W of the gap 52 such that a seal pressure $P_{so}$ between the O-rings is greater than the operating pressure $P_o$ multiplied by a desired gasket factor (i.e., a factor of safety), and such that a seal pressure $P_{st}$ between the O-rings 56 and the test plate 58 is greater than the test pressure $P_t$ multiplied by a desired gasket factor.

In an exemplary embodiment for use with a test plate 58 having a thickness of 0.020 inch, the O-rings 56 preferably have a cross-sectional diameter generally of 0.210 inch (0.533 cm) and the O-ring grooves 54 have a depth D generally of 0.148 inch (0.376 cm). The step 48 preferably has a height of 0.085 inch (0.216 cm), such that each O-ring 56 compresses by about 0.020 inch (0.051 cm) under operating conditions with the test plate 58 removed. Each O-ring 56 compresses by about 0.30 inch (0.76 cm) during testing with the test plate 58 inserted into the gap 52. However, as will be appreciated by one skilled in the art, the extent of compression between the opposing O-rings 56 or between an O-ring 56 and the juxtaposing surface (e.g., the test plate 58) can be readily customized to suit specific sealing pressure requirements of normal and testing operations.

The interior and exterior diameters of the O-rings 56 generally match the corresponding dimensions of the O-ring grooves 54 such that the O-rings 56 snugly sit in the O-ring grooves 54 when assembled. As discussed below, the test plate slides over the O-rings 56 when inserting or removing the test plate 58 from the fixture 16. The test plate 58 produces a tangential frictional force on the surfaces of the O-rings 56 in contact with the test plate 58 when sliding over the O-rings 56. The tight friction fit between the O-ring 56 and the corresponding O-ring groove 54, however, prevents the O-ring 56 from rolling out of the O-ring groove 54.

Each O-ring 56 can have any of a variety of conventional cross-sectional shapes, such as, for example, circular, quad, bevel or lathe. The O-rings 56 preferably comprise a resilient material in accordance with the American Society of Testing Materials (ASTM) standards, such as, for example, neoprene. The material of the O-ring also should be selected to resist any corrosive effect of the fluid within the pipe system 10.

Figure 5:
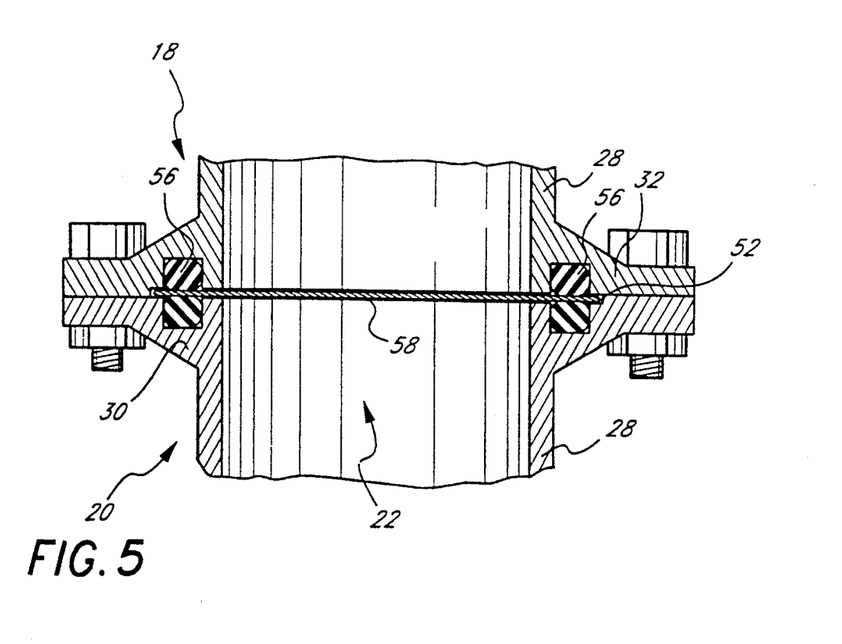
FIG. 5 is a partial cross-sectional view of the fixture of FIG. 4, illustrating a test plate positioned to lock fluid flow though the fixture.

When assembled, the housings 18, 20 of the fixture 16 interconnect in a manner juxtaposing their respective engagement ends 41 to form the socket 52, as described above. The opposing O-rings 56 sufficiently compress against each other with the housing flanges 30 juxtaposed such that a fluid-tight seal occurs at the interface of the fixture housings 18, 20. As discussed above, the dimensions of the step height, O-ring groove depth D and O-ring cross-sectional diameter produce a desired compression between the O-rings 56 to form the fluid-tight seal. The selected dimensions and type of O-ring (e.g., material and cross-sectional shape) further ensure that the O-rings 56 can be compressed by an additional amount sufficient to permit the insertion of a test plate 58, as illustrated in FIG. 5, and to produce a fluid-tight seal between each O-ring 56 and the test plate 58.

As illustrated in FIG. 4, four fasteners 60, such as, for example, bolts 62 and nuts 64, secure together the fixture housings 18, 20. Each bolt 62 is inserted through the bolt holes 42 in the flange 30 and a corresponding nut 64 is threaded and tightened onto the bolt 62 from the opposite side of the flange 30. It is understood, however, that the housings 18, 20 could be secured together by other means, such as, for example, an adhesive, a welded or brazed joint, or rivets, or could be casted together or machined from a single piece of material during the manufacturing process.

FIGS. 2 and 3 illustrate the test plate 58 of the test apparatus 14 used with the fixture 16. The test plate 58 includes a rigid, thin, generally rectangular plate 65. The plate 65 is sized to extend through the socket 52 formed between the housings 18, 20 of the fixture 16 and to completely block the through bore 22 of the fixture 16. That is, when the plate 65 is inserted into the fixture 16 through the socket 52, the plate 65 spans across the through bore 22.

The plate 65 preferably has a thickness slightly less that the width W of the socket gap 52 (i.e., the height of the step 48), and has a length and width longer and wider than the diameter of the through bore 22. In an exemplary embodiment, the plate 65 has a thickness of approximately 0.020 inch (0.051 centimeter), a length of about 3.0 inches (7.6 centimeter) and a width of about 2.86 inches (7.3 centimeter) for use with a fixture 16 having a through bore diameter of 2.0 inches (5.1 centimeter). The size of the plate 65, however, can be manufactured in a wide variety of sizes according to the desired operation and test pressures and the selected fixture 16 size.

The test plate 58 advantageously also includes a handle 66 positioned generally perpendicular to the plate 65 to facilitate inserting and retracting the test plate 58 into and from the fixture 16. The handle 66 is desirably positioned proximate a trailing edge 68 of the test plate 58 such that with the test plate 58 properly inserted into the fixture 16, the handle 66 is accessible. The handle 66 also is preferably integrally formed with the plate 65.

The test plate 58 is desirably manufactured from a stainless steel plate such as, for example, a 300 series stainless steel plate, because stainless steel is substantially resistant to oxidation; oxidation on the surface of the test plate interferes with the insertion and retraction of the test plate 58 into and from the fixture socket 52, as discussed below. The handle 66 is desirably formed by bending the stainless steel plate out of the plane of the plate 65 to a transverse position and then folding a portion of the transverse portion of the plate back onto itself. All sharp edges of the plate are then preferably removed to avoid injury to the plumber's hands and to avoid damage to the O-rings 56.

Referring back to FIG. 1, the fixture 16 is installed into the pipe network 10, preferably between two straight sections of pipe 24, using conventional means. For instance, in a copper pipe network 10, the fixture 16 is brazed or soldered onto the copper pipes 24; in a plastic pipe network 10, the fixture 16 is cemented onto the plastic pipes 24 using an appropriate epoxy sealant; and in a cast iron pipe network 10, the fixture 16 is coupled between two pipe segments using the pair of sleeves 26. However, those skilled in the art will readily appreciate that the fixture 16 can be installed into the plumbing network 10 by other means known in the art.

FIG. 1 illustrates the fixture 16 of the test apparatus 14 installed in a cast iron pipe network 10. In the exemplary embodiment illustrated in FIG. 1, a pair of no-hub ASA Code 022 external rubber sleeves 26, such as the type commercially available from Universal Cast Iron Manufacturing Company, are used to join the tubular portions 28 of the housings 18, 20 to the adjacent pipe segments 24. A pair of conventional pipe clamps 70 positioned at the ends of the sleeve 26 secure each sleeve 26 over an end of the housing 18, 20 and over an end of the adjacent pipe section 24. The pipe clamps 70 are tightened to form a fluid-tight connection between the sleeve 26 and pipe section 24, and between the sleeve 26 and the fixture tubular portion 28, as known in the art.

A plumber inserts the test plate 58 into the fixture socket 52, between the opposing O-rings 56, to test the pipe network 10 for leaks. The test plate is preferably coated with a lubricant, such as, for example, a petroleum or silicon gel, to reduce friction as the plate slides over the O-rings.

As illustrated in FIG. 5, the test plate 58 entirely blocks the through bore 22 when fully inserted to prevent fluid flow through the fixture 16. The O-rings 56 compress against the test plate 58 to create a fluid-tight seal across the O-ring 56/test plate 58 interface.

The plumber fills the pipe network 10 above the test apparatus 14 with water or another appropriate fluid with the test plate 58 blocking the through bore 22 of the fixture. The plumber may fill the pipe network 10 either through the fixture port 36 or through a pipe network opening (not shown) above the fixture 16, such as, for example, a drain or a spout. When the plumber has filled the pipe network 10 with fluid, the plumber visually inspects the junctions 12 of the pipe network 10 for leaks.

A plumber can partially drain the network 10 to fix a leak without fully removing the test plate 58. The handle 66 enables the plumber to partially retract the test plate 58 until fluid flows through the fixture 16. When the water level in the pipe network 10 descends below the leak, the plumber pushes the test plate 58 back into the closed position (i.e., into the position entirely blocking the through bore 22). The plumber then fixes the leak and refills the pipe network 10 with water to test the repaired section.

In addition, the plumber can use a conventional pressure gauge (not shown) to test for leaks, such as, for example, a water test gauge with an indicator of the type commercially available from PASCO, Inc. The plumber attaches the water test gauge to the port 36 to monitor any pressure drop in the "head" of the pipe network 10 above the fixture 16. That is, the weight of the water column in the pipe network 10 above the test apparatus 14 produces substantial pressure on the fluid within the test apparatus 14 which the pressure gauge measures. Leaks in the system will reduce the height, and thus the weight, of the water column in the network 10, and consequently will reduce the pressure in the test apparatus 14 as measured by the gauge. If a pressure drop occurs, the plumber can visually inspect the pipe network 10 to determine the location of the leak.

In an alternative mode of testing, the plumber caps all openings of the pipe network 10 above the test apparatus 14 and air tests the piping system 10. The plumber connects a gas test gauge assembly, such as the type commercially available from PASCO, Inc., to the fixture port 36. The plumber then couples a pressurized fluid source, such as, for example, an air compressor or gas tank, to an inlet port of the gas test gauge assembly and pressurizes the pipe network 10 above the test apparatus 14. The pressure within the pipe network 10 during testing is usually about 5 pounds per square inch (psi) (34.5 kPa). A decrease in pressure measured by the pressure gauge indicates a leak in the pipe network 10 above the test apparatus 14.

After the plumbing contractor completes the test of the pipe network above the test apparatus 14, the test apparatus 14 easily converts back to an open pipe section with minimum effort. The plumber removes the test plate 58 from the fixture 16 by grasping the plate 58 by the handle 66. As the plumber removes the test plate 58, the O-rings 56 expand, contacting each other to form a fluid-tight seal, as described above. The fluid above the fixture 16 freely passes through the through bore 22 with the test plate 58 removed.

The expansion of the O-rings 56 against each other, as the plumber removes the test plate 58, prevents the test fluid within the plumbing network 10 from flowing out the test apparatus 14 and flooding the building. The test apparatus 14 thus offers substantial advantages over prior leakage testing devices which commonly fail causing flooding, or which inherently require some spillage of test fluid when the plumber removes the test fittings from the plumbing network. As discussed above, such flooding typically causes substantial damage at great cost when occurring in multiple story buildings, because contractors conventionally finish lower stories of the building with carpeting, dry-wall, etc., while they simultaneously install and test the plumbing network in upper stories. The present test apparatus 14 prevents such flooding and consequential damage to the building, thus saving labor and repair costs.

The test plate 58 desirably includes a red tag or like indicators (not shown) attached to the handle 66 in order for the plumber to visually inspect a plumbing system 10 for the location of test plates 58. By scanning the piping network 10 for such visible indicators, the plumber can quickly determine whether he or she has removed all test plates 58 for normal operation before the contractor covers the pipes with drywall or like wall covering.

Advantageously, the test apparatus 14 and the described method of use provide a safe, simple and sanitary means to test a network of plumbing pipes for leaks. The test apparatus 14 also allows the plumber to test the pipe network 10 without the danger of flooding and damaging the building, as discussed above.

Moreover, use of the testing apparatus 14 does not pose a potential danger to plumbers. Plumbers using prior leakage testing apparatuses commonly injure their hands, fingers, eyes and faces. The test apparatus 14 of the present invention eliminates such danger. The plumber does not have to insert his or her hands or fingers into the plumbing network 10 to remove the test plate 58, and the test apparatus 14 does not include a retention chain. The plumber simple inserts and retracts the test plate 58 from the socket 52 of the test fixture 16, an easy and safe operation.

Furthermore, the test apparatus 14 allows the network 10 to operate normally with the test apparatus 14 in line, thus facilitating repeated testing of the network 10 and testing of the junctions between the test apparatus 14 and the adjacent pipe sections 24.

Although this invention has been described in terms of a certain preferred embodiment, other embodiments apparent to those of ordinary skill in the art are also within the scope of this invention. For instance, the present invention as described is most suitable for testing drainage systems, vent pipe systems, and other low pressure pipe systems; however, it is contemplate that the test apparatus could be designed with sufficient strength to function in high pressure pipe systems, such as, for example, water mains, pipe lines, etc. It is also contemplated that the fixture 16 could comprise a single O-ring 56 partially disposed in the O-ring groove 54. The O-ring 56 could extend beyond the O-ring groove 54 and compress against the planar interface surface 46 of the opposing housing. In this embodiment, the test plate 58 could slide between the O-ring 56 and the interface surface 46, thus producing a fluid-tight seal between the O-ring 56 and the test plate 58 for testing of the plumbing network 10 on the O-ring side of the fixture 16. Accordingly, the scope of the invention is intended to be defined only by the claims which follow.

What is claimed is:

1. An apparatus for permanent installation in a network of plumbing pipes to facilitate safe, simple and sanitary testing of said network for fluid leakage and to allow simple return of said network to normal operation after said testing, said apparatus comprising:
  a first housing defining a generally circular through bore about a longitudinal axis, said first housing comprising:
    a generally tubular portion, the interior of said tubular portion defining a portion of said bore and the exterior of said tubular portion being generally circular about said axis, a first end of said tubular portion being perpendicular to said axis and defining a distal end of said first housing, a second end of said tubular portion being disposed opposite said first end;

a flange having a first end adjacent said second end of said tubular portion and a second end defining a proximal end of said first housing, said second end of said flange defining a generally planar face perpendicular to said axis, said planar face having a first generally annular O-ring groove therein for receiving an O-ring; and a port through said tubular portion for allowing introduction or removal of fluid through said port;

a second housing defining a generally circular through bore about a longitudinal axis, said second housing comprising:

a generally tubular portion, the interior of said tubular portion defining a portion of said bore and the exterior of said tubular portion being generally circular about said axis, a first end of said tubular portion being perpendicular to said axis and defining a distal end of said second housing, a second end of said tubular portion being positioned opposite said first end; and a flange having a first end adjacent said second end of said tubular portion and a second end defining a proximal end of said second housing, said second end of said flange defining a generally planar face perpendicular to said axis, said planar face having a second generally annular O-ring groove therein for receiving an O-ring;

the axis of said second housing being generally collinear with the axis of said first housing, said proximal end of said second housing juxtaposing said proximal end of said first housing;

first and second resilient generally cylindrical sleeves having a through bore of a diameter generally equal to the outside diameter of said tubular portions for attaching said housings to pipes in said network;

securing means for securing said sleeves to said housing tubular portions and to the pipes and for preventing fluid leakage between said housing and the pipes;

a first O-ring received by said first O-ring groove, a portion of said first O-ring protruding from said first O-ring groove;

a second O-ring received by said second O-ring groove, a portion of said second O-ring protruding from said second O-ring groove;

a selectively removable, generally planar plate interposed between said first and second housings, said plate spanning the through bore of said first and second housings and contacting said first and second O-rings around their periphery, a portion of said plate extending outside said flanges and having a handle for facilitating grasping and manipulating of said plate; and fastener means for urging said proximal ends of said first and second housings together and for urging said protruding portions of said first and second O-rings into contact with said plate, thereby forming generally fluid-tight seals with said plate to prevent fluid flow through said proximal ends of said first and second housings without allowing leakage through said seals, and allowing removal of said plate such that said O-rings contact each other about their respective protruding portions so as to form a sealed joint between said proximal ends of said first and second housings, thereby allowing fluid communication through said proximal ends of said first and second housings without allowing leakage from said bore through said joint, whereby insertion of said plate between said housings prevents fluid flow and allows pressure testing of said network and removal of said plate allows leakage-free fluid communication through said apparatus.

2. The apparatus of claim 1, wherein said fastener means comprises a bolt and a nut.

3. The apparatus of claim 1, wherein said securing means comprises a pipe clamp.

4. The apparatus of claim 1, wherein said flange and said tubular portion of each housing are integrally formed together.

5. An apparatus for installation in a network of plumbing pipes to facilitate testing of said network for fluid leakage, comprising:

first and second housings each having a generally circular through bore about a longitudinal axis, a generally tubular portion having a first end perpendicular to said axis and defining a first distal end of said housing and a second end opposite said first end, and a flange having a first end adjacent to said second end of said tubular portion and a second end defining a proximal end of said housing, said second end of said flange defining a generally planar face perpendicular to said axis, said flange face having a generally annular groove;

first and second sealing members received by said grooves of said first and second housings, respectively;

a selectively removable plate interposed between said first and second sealing members to block the through bore of said first and second housings; and fastener means for urging said first and second sealing members into contact with said plate around the periphery of said sealing members when said plate is interposed between said first and second sealing members so as to form generally fluid-tight seals with said plate to prevent fluid communication through said proximal ends of said first and second housings, and for urging said first and second sealing members into contact with each other when said plate is removed so as to form a sealed joint between said first and second housings to allow fluid communication through said proximal ends of said first and second housings.

6. The apparatus of claim 5 additionally comprising a port through said tubular portion for allowing introduction or removal of fluid through said port and into said through bore.

7. The apparatus of claim 5, wherein said housings are formed of a durable material selected from the group consisting of cast iron, brass, bronze, copper, ABS and PVC.

8. The apparatus of claim 5, wherein said sealing members comprise O-rings.

9. The apparatus of claim 5, wherein said flange and said tubular portion of each housing are integrally formed together.

10. The apparatus of claim 5, wherein said apparatus is adapted to be permanently installed in said network of plumbing pipes.

11. An apparatus for installation in a network of plumbing pipes to facilitate testing of said network for fluid leaks, comprising:

first and second housings each defining a through bore, each housing comprising a generally tubular portion attached to a flange having a generally planar flange face with a sealing member surrounding said through bore, said flange faces of said first and second housing being positioned adjacent to each other such that said sealing member of said first housing contacts said sealing member of said second housing to form a generally sealed joint between said first and second housings; 'a selectively removable plate interposed between said first and second flange faces to generally block said through bores of said first and second housings, said plate being removable from said first and second housings to open said through bores of said first and second housings; and fastener means for urging said sealing members of said first and second housings into contact with said plate when said plate is interposed between said first and second housings so as to form generally fluid-tight seals with said plate to generally prevent fluid communication through said first and second housings, and for urging said first and second sealing members into contact with each other when said plate is removed so as to form a generally sealed joint between said first and second housings.

12. The apparatus of claim 11, wherein said sealing members comprise O-rings.

13. The apparatus of claim 11, wherein said flange and said tubular portion of each housing are integrally formed together.

14. The apparatus of claim 11, wherein said apparatus is adapted to be permanently installed in said network of plumbing pipes.

15. An apparatus for installation in a network of plumbing pipes to facilitate testing of said network for fluid leakage, comprising:

first and second housings each defining a through bore, each housing comprising a generally tubular portion attached to a flange having a generally planar flange face with a sealing member surrounding said through bore;

a port through said tubular portion of said first housing for allowing fluid communication through said port;

a selectively removable plate interposed between said first and second housing flange faces to generally block said through bores of said first and second housings; and fastener means for urging said sealing members of said first and second housing into contact with said plate when said plate is interposed between said first and second housings so as to form generally fluid-type seals with said plate to generally prevent fluid communication through said first and second housings, and for urging said first and second sealing members into contact with each other when said plate is removed so as to form a generally sealed joint between said first and second housings.

16. An apparatus for installation in a network of plumbing pipes to facilitate testing of said network of plumbing pipes for fluid leakage, comprising:

a plate for generally blocking fluid flow through said network of plumbing pipes;

a fitting being configured to insert between two sections of said network of plumbing pipes and defining a through bore about a longitudinal axis, said fitting further defining a socket configured to receive said plate through an aperture of said socket in a position generally transverse to said longitudinal axis to generally block said through bore, said plate being selectively removable from said socket to generally open said through bore; and a sealing member being disposed across said socket aperture, said sealing member seated against said plate with said plate inserted into said socket to form a generally fluid-tight seal with said plate to generally prevent fluid communication through said fitting, and said sealing member seated against opposing portions of said fitting when said plate is removed so as to seal said socket aperture to allow fluid communication through said fitting and to generally prevent fluid communication through said socket aperture.

17. The apparatus of claim 16, wherein said sealing member circumscribe said through bore.

18. The apparatus of claim 17, wherein said sealing member comprises an O-ring.

19. The apparatus of claim 16, wherein said sealing member comprise a pair of opposing O-rings which circumscribe the through bore of the fitting.

20. The apparatus of claim 16, wherein said fitting comprises a first tubular member coupled to a first flange member and a second tubular member coupled to a second flange member, said first and second flange members being interconnected with said sealing member positioned between said first and second flange members.

21. The apparatus of claim 20, wherein said first tubular member and said first flange member are integrally formed together and said second tubular member and said second flange member are integrally formed together.

22. The apparatus of claim 16, wherein said apparatus is adapted for permanent installation in said network of plumbing pipes.

23. An apparatus for installation in a network of plumbing pipes to facilitate testing of said network of plumbing pipes for fluid leakage, comprising:

a plate for generally blocking fluid flow through said network of plumbing pipes;

a fitting being configured to insert between two sections of said network of plumbing pipes and defining a through bore about a longitudinal axis, said fitting further defining a socket configured to receive said plate through an aperture of said socket in a position generally transverse to said longitudinal axis to generally block said through bore, said plate being selectively removable from said socket;

a port in communication with one of said through bores; and a sealing member being disposed across said socket aperture, said sealing member sitting against said plate with said plate inserted into said socket to form a generally fluid-tight seal with said plate to prevent fluid communication through said fitting, and said sealing member sitting against a portion of said fitting when said plate is removed so as to generally seal said socket aperture to allow fluid communication through said fitting and to generally prevent fluid communication through said socket aperture.

24. A method for testing a network of plumbing pipes for leakage comprising the steps of:

providing a first housing defining a through bore and having a generally tubular portion attached to a flange having a generally planar flange face with a generally annular groove containing a sealing member;

providing a second housing defining a through bore and having a generally tubular portion attached to a flange having a generally planar flange face with a generally annular groove containing a sealing member;

providing a plate having a surface larger than a cross-sectional area of each of said through bores;

aligning said first and second housings generally coaxially with their respective flanges faces juxtaposed;

urging said sealing members of said first and second housings into contact with each other so as to form a generally fluid tight seal between said first and second flange faces;

interposing said plate between said first and second housing flange faces so as to generally block the through bore between said first and second housing; and urging said sealing members of said first and second housing into contact with said plate so as to form generally fluid-tight seals with said plate to prevent fluid communication through said first and second housings in order to allowing testing of said network of plumbing pipes.

25. A method for testing a network of plumbing pipes for leakage comprising the steps of:

providing a first housing defining a through bore and having a generally tubular portion attached to a flange having a generally planar flange face with a generally annular groove containing a sealing member;

providing a second housing defining a through bore and having a generally tubular portion attached to a flange having a generally planar flange face with a generally annular groove containing a sealing member;

providing a plate having a surface larger than a cross-sectional area of each of said through bores;

aligning said first and second housings generally coaxially with their respective flanges faces juxtaposed;

providing a gap in said network of plumbing pipes by removing therefrom a segment of pipe, said gap being sized to receive said aligned first and second housings;

inserting said first and second housings into said gap in said network of plumbing pipes;

securing said first and second housings in said network of plumbing pipes at first and second joints;

sealing at least one joint between said first and second housings and said network of plumbing pipes;

interposing said plate between said first and second housing flange faces so as to generally block the through bore between said first and second housings; and urging said sealing members of said first and second housings into contact with said plate so as to form generally fluid-tight seals with said plate to prevent fluid communication through said first and second housings.

26. The method of claim 25, wherein said securing and sealing steps are accomplished by the steps of:

providing rubber sleeves and positioning said sleeves over said tubular portions and the adjacent pipes of said network; and providing pipe clamps, and securing said rubber sleeves over said tubular portions and over said pipes by tightening said pipe clamps.

27. A method for testing a network of plumbing pipes for leakage comprising the steps of:

providing a first housing defining a through bore and having a generally tubular portion attached to a flange having a generally planar flange face with a generally annular groove containing a sealing member;

providing a second housing defining a through bore and having a generally tubular portion attached to a flange having a generally planar flange face with a generally annular groove containing a sealing member;

providing a plate having a surface larger than a cross-sectional area of each of said through bores;

aligning said first and second housings generally coaxially with their respective flanges faces juxtaposed;

interposing said plate between said first and second housing flange faces so as to generally block the through bore between said first and second housings;

urging said sealing members of said first and second housings into contact with said plate so as to form generally fluid tight seals with said plate to prevent fluid communication through said first and second housings;

providing a port in one of said housings;

filling a portion of said network by adding fluid through said port; and inspecting said network for leaks.

28. The method of claim 27, wherein said step of inspecting is accomplished by visual inspection of said network.

29. The method of claim 27, wherein said step of inspecting is accomplished by monitoring fluid pressure in said network.

30. The method of claim 27, further comprising the steps of:

draining said fluid from said network;

plugging said port; and removing said plate from said testing apparatus.

31. A method for safe, simple, and sanitary testing of a network of plumbing pipes for fluid leaks which allow simple return of the network to normal operation after completion of the testing, said method comprising the steps of:

providing a test leakage apparatus comprising a plate for generally blocking fluid flow through said network of plumbing pipes, a fitting and a sealing member, said fitting being configured to insert between two sections of said network of plumbing pipes and define a through bore about a longitudinal axis, said fitting further defining a socket configured to receive said plate through an aperture of said socket and in a position generally transverse to said longitudinal axis to generally block said through bore, said plate being selectively removable from said socket, said sealing member being disposed across said socket aperture, said sealing member seated against said plate with said plate inserted into said socket to form a generally fluid-tight seal with said plate to generally prevent fluid communication through said fitting, said sealing member seated against opposing portions of said fitting with said plate removed so as to form a generally sealed joint across said socket aperture to allow fluid communication through said fitting and to generally prevent fluid communication through said socket aperture;

coupling said leak test apparatus to said network of plumbing pipes;

inserting said plate of said test leakage apparatus into said fitting of said test leakage apparatus so as to block said through bore of said fitting;

forming a seal between at least one side of said plate and said fitting;

filling a portion of the plumbing pipe network with a fluid;

inspecting said network of plumbing pipes for leaks; and removing said plate from said fitting to drain the fluid from the network of plumbing pipes.

* * * * *

UNITED STATES PATENT AND TRADEMARK OFFICE
CERTIFICATE OF CORRECTION

PATENT NO. : 5,287,730
DATED : February 22, 1994
INVENTOR(S) : Duane R. Condon

It is certified that error appears in the above-indentified patent and that said Letters Patent is hereby corrected as shown below:

Column 15, line 46, change "respective flanges faces" to --respective flang faces--.

Signed and Sealed this

Thirtieth Day of August, 1994

Attest:

BRUCE LEHMAN

*Attesting Officer*  *Commissioner of Patents and Trademarks*